(12) United States Patent
Ogura

(10) Patent No.: US 7,200,288 B2
(45) Date of Patent: Apr. 3, 2007

(54) IMAGE READING USING IRRADIATED LIGHT

(75) Inventor: Makoto Ogura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 10/301,746

(22) Filed: Nov. 22, 2002

(65) Prior Publication Data

US 2003/0103686 A1   Jun. 5, 2003

(30) Foreign Application Priority Data

Dec. 4, 2001   (JP)   ............................. 2001-370171
Oct. 23, 2002  (JP)   ............................. 2002-308491

(51) Int. Cl.
*G06K 9/20* (2006.01)
*G06K 9/00* (2006.01)

(52) U.S. Cl. ..................................... 382/321

(58) Field of Classification Search ................ 382/115, 382/123, 124, 126, 127.312, 321; 358/505, 358/514; 356/71, 305; 359/19, 196; 345/168; 600/322, 344; 705/43
See application file for complete search history.

(56) References Cited

U.S. PATENT DOCUMENTS 6,061,666 A * 5/2000 Do et al. ...................... 705/43
6,327,376 B1 * 12/2001 Harkin ......................... 382/124
6,614,422 B1 * 9/2003 Rafii et al. ................... 345/168
6,681,128 B2 * 1/2004 Steuer et al. ................. 600/322
6,725,075 B2 * 4/2004 Al-Ali ........................... 600/344
6,745,061 B1 * 6/2004 Hicks et al. .................. 600/344
6,760,607 B2 * 7/2004 Al-All .......................... 600/322
6,829,375 B1 * 12/2004 Higuchi ....................... 382/124
6,885,439 B2 * 4/2005 Fujieda ......................... 356/71
6,985,764 B2 * 1/2006 Mason et al. ................ 600/344
2003/0103686 A1 * 6/2003 Ogura ........................... 382/321

FOREIGN PATENT DOCUMENTS

JP         06-096195      4/1994
JP        2000-090251     3/2000
WO         00/39744       7/2000

* cited by examiner

*Primary Examiner*—Amir Alavi
(74) *Attorney, Agent, or Firm*—Fitzpatrick, Cella, Harper & Scinto

(57) ABSTRACT

The present invention relates to an image input device including a substrate, a light sensor, a light emitter, and a light guide. The light sensor, the light emitter, and the light guide are provided on the substrate. The light emitted from the light emitter is guided to a position above the light sensor by the light guide.

9 Claims, 4 Drawing Sheets

IMAGE READING USING IRRADIATED LIGHT

BACKGROUND OF THE INVENTION

1. Field of the Invention

The present invention relates to image input devices, and more particularly, relates to a device which performs image input of a fingerprint by irradiating a finger placed on a light sensor with light emitted from a light emitter, and detecting light diffused in and transmitted through the finger.

2. Description of the Related Art

Hitherto, as an image input device for fingerprints, for example, there has been a device such as, for example, the device disclosed by Japanese Unexamined Patent Application Publication No. 6-96195. According to the device mentioned above, a fingerprint is detected by placing a finger on a first surface side of a triangular prism; irradiating the finger with light passing through the prism, the light being emitted from light emitter which is disposed at a second surface side of the prism; and detecting light reflected from the finger by a camera or the like disposed at a third surface side of the prism.

Image input devices having the aforementioned configuration adequately perform image inputting. However, since the light emitter, the camera, and the prism are disposed in a three-dimensional way, the aforementioned image input device tends to be large in size, and, as a result, it has been difficult to mount this device on a portable apparatus such as, for example, a notebook type personal computer or a personal digital assistant (PDA).

SUMMARY OF THE INVENTION

According to one aspect of the present invention, there is provided an image input device including a substrate, a light sensor, a light emitter, and a light guide. The light sensor, the light emitter, and the light guide are provided on the substrate; and light emitted from the light emitter is guided to a position above the light sensor by the light guide.

In addition, the image input device of the present invention is an image input device for fingerprints that reads a fingerprint of a finger placed on the light sensor as an object.

In addition, it is preferable that the light guide comprise a molded light transmissive resin or a light transmissive resin applied to the substrate. Furthermore, the light transmissive resin may also be used as a sealing material to seal bonding wires.

It is preferable that the light guide have a reflection surface for reflecting light emitted from the light emitter toward the object. In addition, a reflection film is preferably provided on light guide, or a reflector is preferably provided so as to be in contact with the light guide. The reflection film and the reflector are provided for reflecting light emitted from the light emitter toward the object.

The image input device may further comprise a light transmissive protector on the light sensor, and the object (in particular, a finger) is preferably placed on the protector.

The light emitter is preferably provided so as to surround the periphery of the light sensor; however, the light emitter may also be provided at two sides of the light sensor.

The image input device described above may further comprise shade member disposed at least between the periphery of the light sensor and the light emitter.

In addition, the shade member preferably comprises a conductive material.

It is preferable that a protector, which only allows light having a predetermined wavelength to pass therethrough, be disposed on the light sensor, and that a finger be placed on the protector. In particular, when the light emitter emits infrared light, the protector preferably comprises a silicon substrate.

According to another aspect of the present invention, an image input device includes a substrate, means for sensing light, means for emitting light, and means for guiding light. The means for sensing light, the means for emitting light, and the means for guiding light are provided on the substrate; and light emitted form the means for emitting light is guided to a position above the means for sensing light by the means for guiding light.

According to yet another aspect of the present invention, there is provided an image input device including a light sensor, a light emitter, and a light guide. The light sensor, the light emitter, and the light guide are provided on a substrate; and light emitted from the light emitter is guided to a position above the light sensor by the light guide.

Further objects, features and advantages of the present invention will become apparent from the following description of the preferred embodiments with reference to the attached drawings.

DESCRIPTION OF THE PREFERRED EMBODIMENTS

Hereinafter, preferred embodiments of the present invention will be described in detail with reference to drawings.

Figure 1:
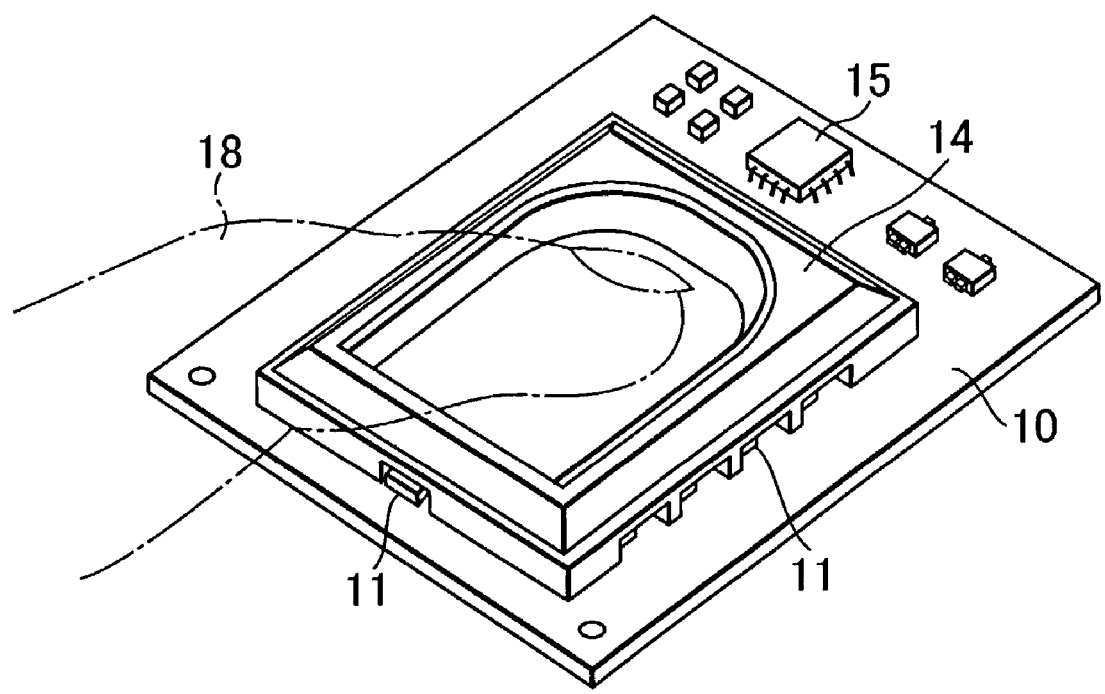
FIG. 1 is a perspective view of an image input device for fingerprints according to a first embodiment of the present invention.
Figure 2:
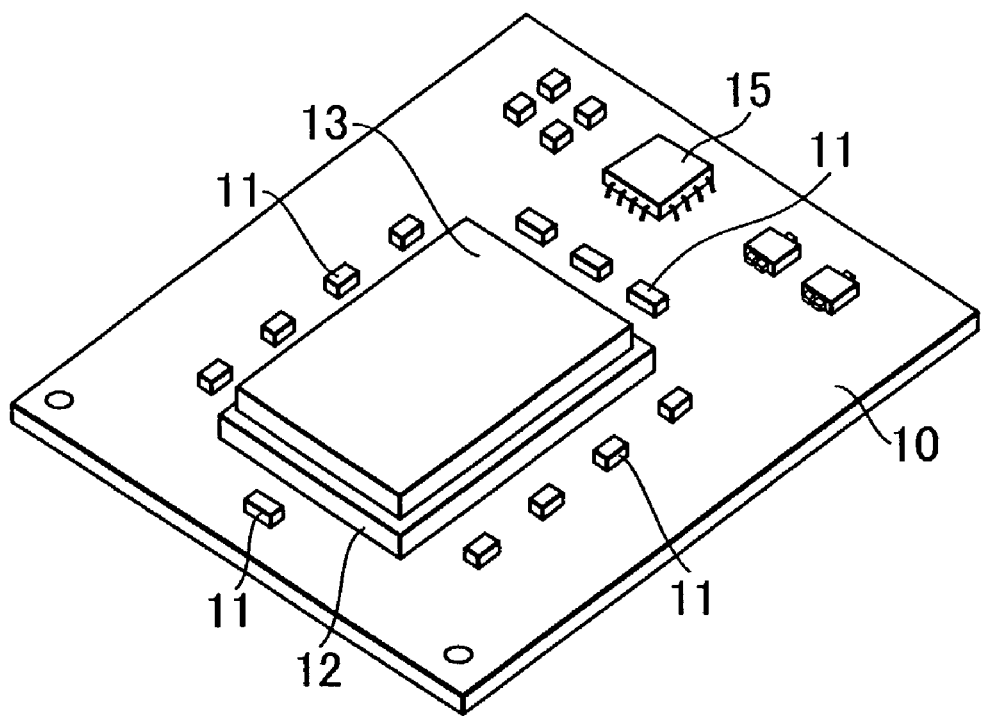
FIG. 2 is a perspective view of the image input device shown in FIG. 1 in which a light guide is removed from the device.
Figure 3:
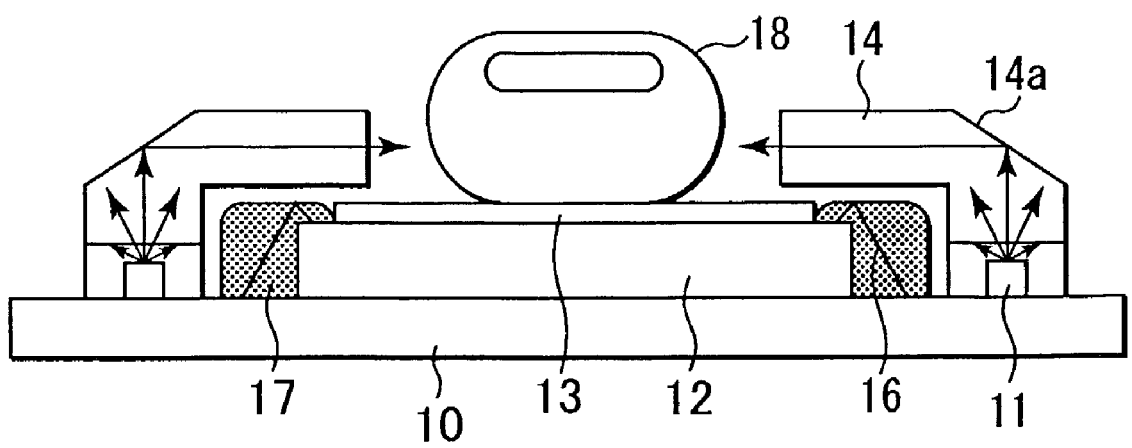
FIG. 3 is a schematic cross-sectional view of the image input device shown in FIG. 1.

FIG. 1 is a perspective view of an image input device for fingerprints according to a first embodiment of the present invention, and FIG. 2 is a perspective view of the image input device shown in FIG. 1 in which a light guide is removed therefrom. FIG. 3 is a schematic cross-sectional view of the image input device shown in FIG. 1.

Referring now to FIGS. 1 and 2, on a circuit substrate 10, there are provided LEDs 11 and a light sensor 12 such as a charged coupled device (CCD) or metal oxide semiconductor (MOS) sensor. The LEDs 11 serve as light emitters. FIG. 1 also illustrates a finger 18 placed on the light sensor 12. On the light sensor 12, a protector 13 comprised of a thin-plate glass or fiber plate may be optionally provided. When, as is illustrated in FIG. 1, a protector 13 is provided, the finger 18 is to be placed on the protector 13. However, a film may adequately protect the light sensor. When the protection is satisfactory accomplished by, for example, a silicon nitride film or silicon oxide film formed on the light sensor 12, the protector may be omitted.

In addition, the protector 13 may be formed of a material which allows only selected wavelengths of light, emitted from the LEDs 11 functioning as lighting means, to pass through and which guides this light to the light sensor 12. Accordingly, when, for example, the light emitted from the LEDs 11 is infrared light, the protector 13 must not be transparent as well as being formed of a material which allows the infrared light to pass therethrough. As a non-limiting example, a silicon substrate may be used as an infrared-passing protector. The reason for this is that image with less noise can be obtained since the silicon substrate can prevent visible light from entering from the outside and only allow the infrared light, which is necessary as information, to pass through the silicon substrate, the infrared light being emitted from the LEDs 11, and passing through the finger 18.

The LEDs 11 may be provided so as to surround the periphery of the light sensor 13. However, it is to be understood that it is not always necessary that the entire periphery of the light sensor 13 be surrounded by the LEDs 11. For example, the LEDs 11 may be aligned at both sides of the light sensor 13 so that the finger 18 may be irradiated along the longitudinal sides thereof.

As FIG. 1 illustrates, a light guide 14, which functions as a light guide, covers the LEDs 11 and guides emitted light to the finger 18 placed either on the light sensor 12 or on the protector 13. After being diffused in the finger 18, the light incident on the finger 18 passes through the surface of the fingertip on which the fingerprint is present and then enters the light sensor 12, so that light intensity pattern in accordance with ridges (fingerprint irregularities) of the fingerprint is detected by the light sensor 12. From this light intensity pattern, characteristic points of the fingerprint, such as ends of wrinkles, are extracted, and by comparing the positions of this characteristic points with the fingerprints among fingerprint data registered beforehand, it can be identified whether a person having the fingerprint is a right person.

The light guide 14 is preferably composed of a highly transmissive material, such as polycarbonate or acrylic resin, which can be formed by resin molding. The light transmissive resin may be applied to the substrate 10. When the light guide 14 is detachably provided on the circuit substrate 1, a light guide having an appropriate size can be provided in accordance with the size of an adult or a child finger. The light guide 14 serves as a light guide, and, in addition, also serves as a mechanical protector for the LEDS 11 and the light sensor 13 and as a finger guide so that a fingertip is placed on a predetermined position of the light sensor. Reference numeral 15 indicates an electronic element such as an integrated circuit (IC) provided on the circuit substrate 10, and this electronic element serves as a circuit element for driving the light sensor and the LEDs and for performing the identification of fingerprints.

In FIG. 3, reference numeral 16 indicates bonding wires connecting the light sensor to the circuit substrate 1, and reference numeral 17 indicates a sealing resin applied so as to cover the bonding wires 16. Reference numeral 14a indicates a reflection surface of the light guide 14, the tilt angle of which is determined so that light emitted from the LEDS 11 is totally reflected from the reflection surface and then irradiates the finger.

Figure 4:
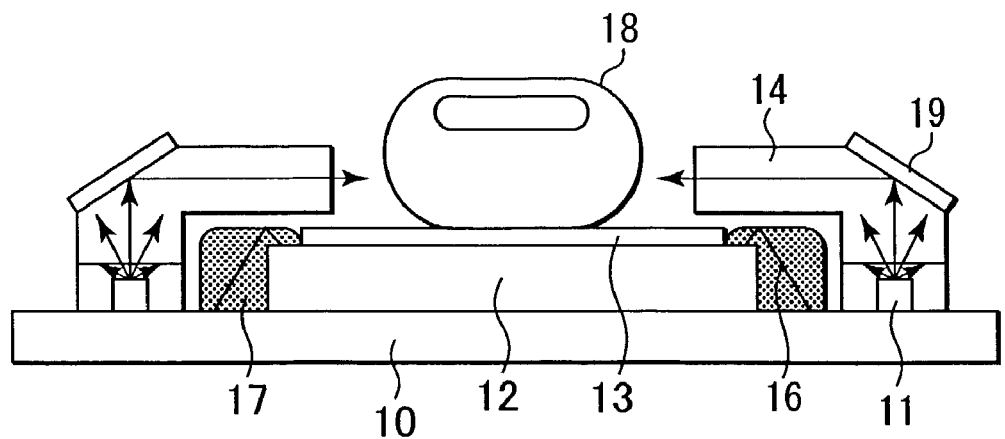
FIG. 4 is a schematic cross-sectional view of an image input device for fingerprints according to a second embodiment of the present invention.

FIG. 4 is a schematic cross-sectional view of an image input device for fingerprints according to a second embodiment of the present invention. In this embodiment, in order to improve the efficiency of light emitted from the LEDS 11 at the light guide 14, a reflection layer 19 is provided on the light guide 14. The reflection layer 19 may be formed by deposition of a metal such as, for example, aluminum or chromium, or by adhesion of a metal foil such as, for example, an aluminum foil.

Figure 5:
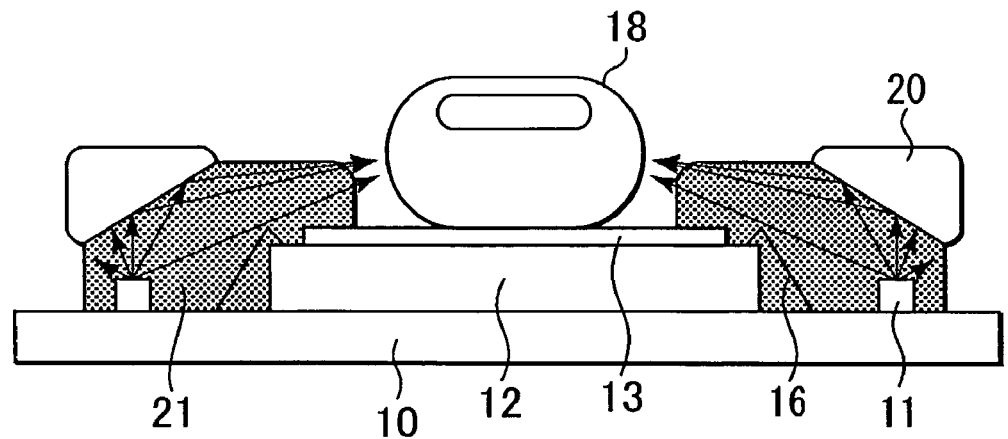
FIG. 5 is a schematic cross-sectional view of an image input device for fingerprints according to a third embodiment of the present invention.

FIG. 5 is a schematic cross-sectional view of an image input device for fingerprints according to a third embodiment of the present invention. In this embodiment, instead of the light guide 14, a light transmissive resin is used as a sealing resin 21 so as to serve as a light guide. The sealing resin is formed so as to cover both the bonding wires 16 and the LEDs 11. In this embodiment, a prism 20 used as a reflector is provided in contact with the sealing resin 21 for forming a reflection surface, and light emitted from the LEDs 11 is reflected therefrom so that the finger is then irradiated with the light. In addition, as shown in FIG. 3, a reflection surface capable of performing total reflection may be provided on the sealing resin, or, as shown in FIG. 4, a metal such as aluminum or chromium may be deposited on or a meal foil such as an aluminum foil may be adhered to the sealing resin.

As the light transmissive resin material, for example, an epoxy, silicone, urethane, or olefinic resin may be used.

Figure 6:
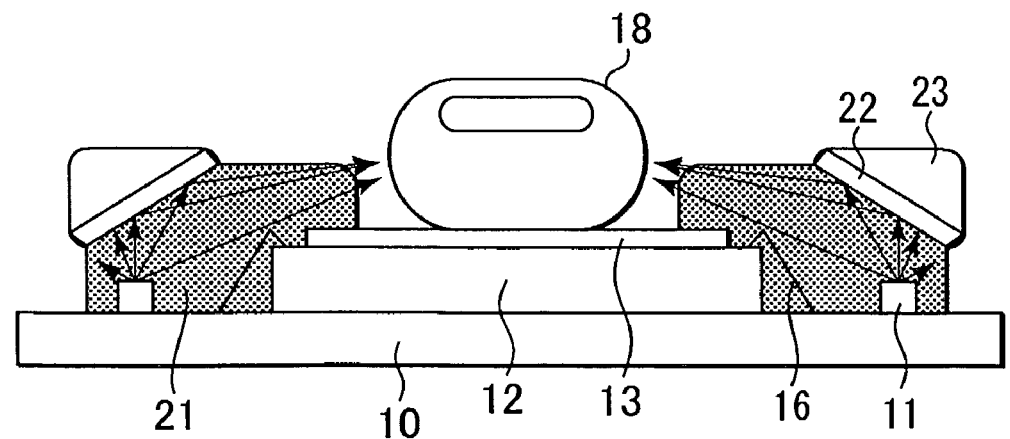
FIG. 6 is a schematic cross-sectional view of an image input device for fingerprints according to a fourth embodiment of the present invention.

FIG. 6 is a schematic cross-sectional view of an image input device for fingerprints according to a fourth embodiment of the present invention. In this embodiment, in order to improve the efficiency of light emitted from the LEDs 11, a reflection layer 22 is further provided on the sealing resin 21 of the above embodiment shown in FIG. 5. The reflection layer 22 can be formed by, for example, deposition of a metal such as aluminum or chromium or by adhesion of a metal foil such as an aluminum foil. Alternatively, a member provided with a metal layer formed of aluminum, chromium, or the like by deposition or a member provided with an aluminum foil or the like by adhesion may be disposed in contact with the sealing resin 21 to form a reflection surface. FIG. 6 shows the case in which the reflection surface is formed by adhering the reflection film 22 to a base body 23 such as a prism. In this case, since the light from the LEDs is reflected from the reflection film 22, any type of material may be used for forming the base body 23 as long as the reflection film 22 can be formed thereon, and hence a prism need not always be used.

Figure 7:
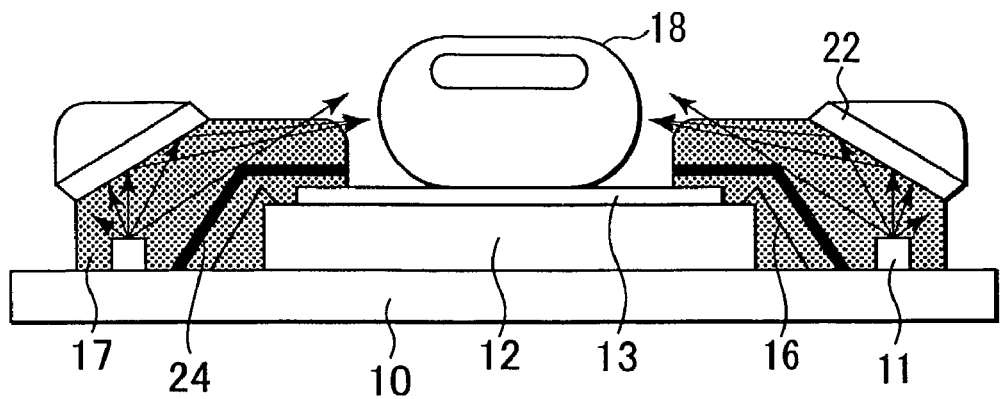
FIG. 7 is a schematic cross-sectional view of an image input device for fingerprints according to a fifth embodiment of the present invention.

FIG. 7 is a schematic cross-sectional view of an image input device for fingerprints according to a fifth embodiment of the present invention. In this embodiment, shade member 24 is provided between the LEDs 11 functioning as the lighting means and the light sensor 12 of the above embodiment shown in FIG. 6 so as,to surround the periphery of the light sensor 12. This shade member 24 serves to prevent unnecessary light from entering the light sensor 12. As used herein, the unnecessary light includes light entering the light sensor without irradiating the finger and outside light from the finger 18 side or from the periphery of the light guide 21.

The shade member 24 may be formed, for example, of a metal sheet, shading film, resin, or the like.

The shade member 24 reduces the unnecessary light and a fingerprint image having a high S/N ratio can be read.

Figure 8:
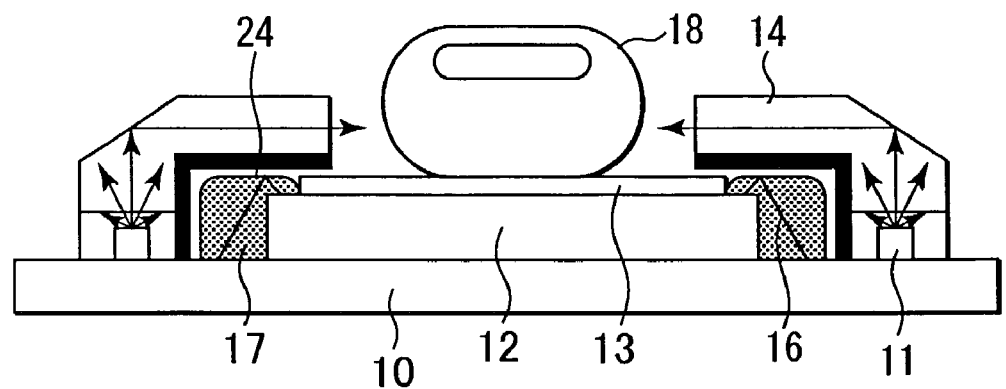
FIG. 8 is a schematic cross-sectional view of an image input device for fingerprints according to a sixth embodiment of the present invention.

FIG. 8 is a schematic cross-sectional view of an image input device for fingerprints according to a sixth embodiment of the present invention. In this embodiment, shade member 24 is provided inside the light guide 14 and between the LEDs 11 functioning as the lighting means and the light sensor 12 of the above embodiment shown in FIG. 3 so as to surround the light sensor 12.

The shade member 24 may be formed of, for example, a metal sheet, shading film, resin, or the like.

In a particularly advantageous arrangement, when the shade member 24 is formed of a metal sheet, a part thereof may be grounded. As a result, an antistatic effect and electromagnetic shielding effect can be obtained.

Figure 9:
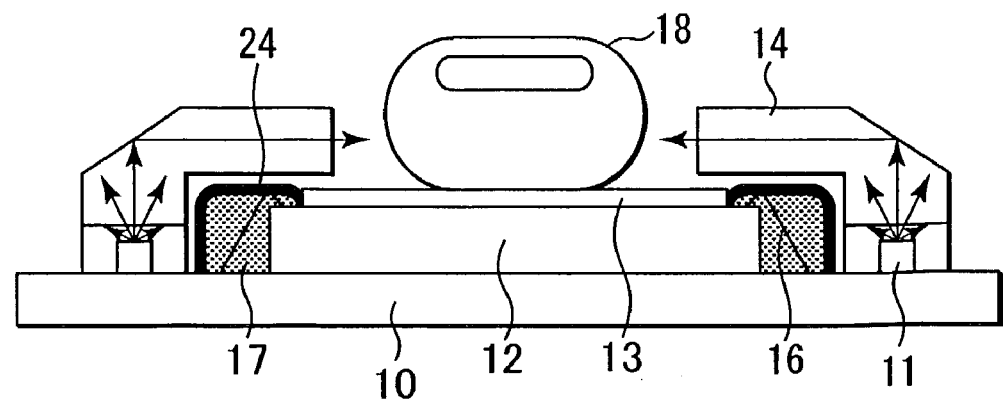
FIG. 9 is a schematic cross-sectional view of an image input device for fingerprints according to a seventh embodiment of the present invention.

FIG. 9 is a schematic cross-sectional view of an image input device for fingerprints according to a seventh embodiment of the present invention. This embodiment differs from that shown in FIG. 8 in that the shade member 24 is provided on the surface of the sealing resin 17.

In this case, the shade member 24 may be formed, for example, by applying an epoxy-based resin, acrylic resin, silicone resin, or the like. Alternatively, the sealing resin may have shading properties in itself.

In addition, by adding a light-scattering material to the light guide or the light transmissive resin so as to scatter light emitted from the lighting means such as LEDs, light emission irregularities such as those that may result by the lighting mean being arranged in a stripe may be reduced.

As described above, the present invention provides an image input device for fingerprints which can meet the trend toward miniaturization and can be manufactured at reasonable cost, and in the device described above, light emitted from the light emitter can be guided efficiently to the finger.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading device that irradiates light emitted from a light emitter to an object and receives light diffused in the object by an optical sensor, wherein the light received by the optical sensor is light irradiated to a part of the object that is different from a part having an image entering the optical sensor, the device comprising:
   the optical sensor;
   the light emitter; and
   a light guide comprised of a molded light transmissive resin for guiding the light emitted from the light emitter from a position of the light emitter to a position of the object above the optical sensor,
   wherein the optical sensor, the light emitter and the light guide are provided on a substrate,
   the light emitter surrounds the periphery of the optical sensor and is covered by a light entering surface of the light guide, and a light emitting surface of the light guide is placed above the optical sensor,
   the light guide has a reflection surface for reflecting incident light from the light entering surface toward a position above the optical sensor, and
   the image reading device is configured such that the light emitted from the light emitter passes through the light guide before reaching the object.

2. An image reading device according to claim 1, wherein the object is a finger and said image reading device reads a fingerprint of the finger placed on the optical sensor.

3. An image reading device according to claim 2, wherein said light guide is used as a guide to place the object at a predetermined position.

4. An image reading device according to claim 1, further comprising a reflection film, wherein said reflection film is provided on the reflection surface.

5. An image reading device according to claim 1, further comprising a light transmissive protector on the optical sensor and wherein the object is placed on said light transmissive protector.

6. An image reading device according to claim 5, wherein said protector selectively allows light having a predetermined wavelength to pass therethrough.

7. An image reading device according to claim 1, wherein said light emitter is provided at two sides of the optical sensor.

8. An image reading device according to claim 1, further comprising a shade member disposed at least partially between the periphery of the optical sensor and said light emitter.

9. An image reading device according to claim 8, wherein said shade member comprises a conductive material.

* * * * *